US010599920B2

(12) United States Patent
Mojaver

(10) Patent No.: US 10,599,920 B2
(45) Date of Patent: Mar. 24, 2020

(54) AUTOMATED DIGITAL MAGNIFIER SYSTEM WITH HAND GESTURE CONTROLS

(71) Applicant: Epilog Imaging Systems, San Diego, CA (US)

(72) Inventor: Michael Mojaver, Poway, CA (US)

( * ) Notice: Subject to any disclaimer, the term of this patent is extended or adjusted under 35 U.S.C. 154(b) by 157 days.

(21) Appl. No.: 15/422,048

(22) Filed: Feb. 1, 2017

(65) Prior Publication Data

US 2018/0220080 A1 Aug. 2, 2018

(51) Int. Cl.
| | |
|---|---|
| *G06F 3/01* | (2006.01) |
| *G06K 9/00* | (2006.01) |
| *H04N 5/225* | (2006.01) |
| *H04N 5/232* | (2006.01) |
| *G06F 3/03* | (2006.01) |
| *H04N 5/247* | (2006.01) |

(52) U.S. Cl.
CPC ......... *G06K 9/00355* (2013.01); *G06F 3/017* (2013.01); *G06F 3/0304* (2013.01); *G06K 9/00389* (2013.01); *H04N 5/22525* (2018.08); *H04N 5/232* (2013.01); *H04N 5/247* (2013.01)

(58) Field of Classification Search
CPC ........... G06K 9/00355; H04N 5/22525; H04N 5/23216; H04N 5/23293; G06F 3/017
USPC .......................................................... 348/63
See application file for complete search history.

(56) References Cited

U.S. PATENT DOCUMENTS

| | | | |
|---|---|---|---|
| 5,974,169 A | 10/1999 | Bachelder | |
| 6,480,615 B1 | 11/2002 | Sun et al. | |
| 6,734,911 B1 | 5/2004 | Lyons | |
| 6,883,843 B2 | 4/2005 | Van Damme et al. | |
| 8,818,034 B2 | 8/2014 | Zhang et al. | |
| 9,390,320 B2 | 7/2016 | Kounavis et al. | |
| 2009/0217211 A1* | 8/2009 | Hildreth | G06F 3/017 715/863 |
| 2011/0289462 A1* | 11/2011 | Harris | G06F 3/04883 715/863 |
| 2014/0211047 A1* | 7/2014 | Lee | H04N 5/23216 348/240.99 |
| 2017/0013179 A1* | 1/2017 | Kang | G06F 3/04883 |

* cited by examiner

*Primary Examiner* — Ayman A Abaza
(74) *Attorney, Agent, or Firm* — Nelson Mullins Riley & Scarborough LLP; Thomas J. Engellenner; Reza M. Mollaaghababa

(57) ABSTRACT

An imaging system includes one or more cameras, a display and processing system. The system can include a processor for receiving image data sets to generate combined images of the field of view and a magnified stabilized portion. Various embodiments emulate a digital magnifier or digital mirror applications. In some implementations, the processor can employ the captured images to detect one or more objects of interest (e.g., one or more objects moving within the field of view), in particular the object being magnified, the users' hand and fingers, along with gestures and held tools to affect the acquisition, tracking and magnification of the active work area.

15 Claims, 7 Drawing Sheets

300

AUTOMATED DIGITAL MAGNIFIER SYSTEM WITH HAND GESTURE CONTROLS

FIELD

The invention relates generally to imaging and display systems and more particularly, to magnification devices and interactive displays that can assist in performing detailed manual work. Examples of work requiring magnifiers include micro-assembly, inspections, medical procedures, reading (by visually impaired persons) and applying cosmetics. More particularly, the present invention relates to a vision enhancement device that can provide magnified computer generated images, and can be controlled by computer vision detected hand gestures.

BACKGROUND

Magnification devices in the form of lenses and mirrors have been utilized to assist people with performing detailed hand work for centuries. By utilizing simple lenses and mirrors, one can increase the precision and speed of the work at hand, for example assembling and inspecting small parts, observing lesions, implanting a tooth or applying skin and hair products. Magnifiers allow magnifications, for example as low as 2× and as high as 20× or more. The most common magnifiers in use today are hand-held lenses and mirrors incorporating a light source. Holding a magnifier by hand for long periods of time can be tedious and can tie up one's hand. Accordingly, magnifiers are often mounted onto some type of stand. The stand can be desktop or wall mounted, or sometimes head-mounted, for example in the form of spectacles or telescopes worn by physicians or watch makers.

More recently, video based magnifiers have proven advantageous. A video based magnifier uses a camera to pick up the image from the work area and displays a magnified portion on a monitor or computer screen in front of the operator. Similar to standard optical magnifiers, video magnifiers are manufactured as hand-held, fixed, or head mounted. By the virtue of the image being picked up in electronic form, the magnified image can be displayed more flexibly, for example on a local display, a computer display or a remote display via a wired or wireless connection. Similar to bi-focal optics used in conventional magnifiers, side-by-side or picture-in-picture (PIP) presentation of images at different magnification levels can be provided to the operator.

A main deficiency of traditional magnifying devices is the repetitive and frequent nature of manual interaction and adjustments needed to maintain a steady view of the work area in the user's field of view. This problem is compounded at higher magnifications with increasingly limited working field of view and increasing image instability and susceptibility to vibration. While hand-held devices allow flexible positioning of the magnifier relative to an object being viewed, they generally require dedicating one hand. Fixing the lens or mirror to a stand frees up one hand, however requires frequent repositioning of either the magnifier or the work piece to maintain focus. Head mounted magnifiers allow easy positioning of the magnification point however at the expense of restricted operator peripheral vision and situational awareness.

Accordingly, there is a need for enhanced magnification devices and associated magnification methods.

SUMMARY

The following summary is included to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

A technique for using a computerized analysis of a sequence of still images captured by a video magnifier camera to select and track a magnification target is described. The technique takes advantage of the presence of the operator's hands and fingers within the field of view of the camera. Hands and fingers can be independently detected along with tools for example tweezers, blades, brushes, etc. as well as materials like screws, adhesives, etc. In most cases, the magnified region is ideally placed either adjacent to the operator's index finger or at the head of a tool. Robust image processing algorithms, well known in the art, can be utilized for detection of objects, hands and fingers.

In another aspect, maintaining the user context and situational awareness relative to the work area can improve work flow efficiency. For example, a person assembling small electronic components onto a printed circuit board (PCB) using a magnifying lens can rapidly navigate the work area to locate components or tools, return to the application point, complete a task and repeat the process. Likewise, a person working with a magnifying mirror while applying skin or hair color product can navigate the surrounding area searching for materials or tools then return to the application point of view.

In some embodiments of this invention, one or more fixed or movable cameras are used in conjunction with a flexible display system mounted locally, or remotely (such as via a wireless link), to augment a magnified view with user context. In another aspect, an intuitive user interface provides a highly interactive and immersive user experience with minimal impact on the work flow. As will be explained in more detail below the display system can simultaneously show multiple magnification levels that can be navigated quickly using gestures, without losing situational awareness.

In another aspect this invention can include application-specific object recognition algorithms to locate and stabilize the magnifier onto a field of view, e.g., to follow the work in progress. Object movements may be intentional (e.g., shifts or rotations) or unintentional (such as resulting from drifting or vibration of a work piece). Object recognition can also be applied to identification of tools, for example to track a tool tip, etc. Additionally, hand gestures can be used to navigate the user interface, for example changing or holding the magnified positions or to adjust magnification levels.

In another aspect more than one camera, fixed or movable, with wired or wireless connectivity can be integrated to provide complimentary vantage points. Secondary cameras can be placed behind, to the sides, below or above the object as best suited to the work flow. Additional cameras can aid working around obstacles, corners, or other blind spots or within cavities. In some embodiments in which multiple cameras are employed, the system can automatically switch the display system to the appropriate camera by tracking the hands or as directed by hand gestures.

In some embodiments, one or more cameras are connected to a computer, having an operating system and a monitor and a processor, that is configured to display the overview and magnified images. The processor executes a program including instructions for: capturing an image or video from the system; identifying and tracking the user's hands from the image or video, as well as selecting the object being manipulated.

In another aspect the imaging system performs a method for obtaining object dimensions using the hand or one or more fingers as a relative scale, with an algorithm, which includes measuring an object's dimension in pixels and transforming the measured pixels to a known unit of measurement based on geometric and statistical models, and comparison with previously obtained data. The data can be used to determine the best magnification scale for user presentation.

Various embodiments can also be optimized to function as a smart digital lens or a smart digital mirror, in hand-held, fixed, or head mounted configurations. For example in a head mounted configuration, for example, for visually impaired persons, the system can be programmed to automatically magnify and maintain in lock position the text on a page within a book directly in front of the user's right or left index finger as it scans a page. In another example, a desktop embodiment can be programmed for printed circuit board (PCB) inspection, allowing zooming and locking onto a component with a tap gesture. In another embodiment, a wall mounted system can be used as a mirror, automatically tracking the application of color or makeup to the user's face. In each instance the position and orientation of the hand, fingers as well as associated tools could be leveraged to best track the position of the work in progress.

In a related aspect, an imaging system is disclosed, which includes at least one camera for capturing a time-sequenced images of a scene, a processor for analyzing said images so as to detect at least an object in said scene, a display in communication with said processor for displaying at least first and second views of said scene based on said captured images, where the second view corresponds to a narrower field of view of said scene relative to the first view and is characterized by a magnification level greater than a magnification associated with the first view, wherein said processor determines said magnification level based on a detected attribute of said object. In some embodiments, the processor determines which part of the scene is displayed in the second displayed view based on the detected object. In some embodiments, the detected object can be a user's finger and the attribute can be a gesture made by the finger.

As exemplified above, it is useful to have a magnifying system that actively assists a user with maintaining an application point-locked to the user's field of view. Additionally, allowing smooth transitions in magnification levels, from the application point, to the surrounding area improves work flow speed and efficiency. In additional embodiments the task being performed can be recorded to a storage medium in video form or as a sequence of still images, for documentation or training purposes in a manner similar to how a photographer or videographer can videotape a procedure.

BRIEF DESCRIPTION OF THE DRAWINGS

The invention will be more fully understood from the following detailed description taken in conjunction with the accompanying drawings, in which like numerals are used to refer to like elements.

DETAILED DESCRIPTION

Certain exemplary embodiments will now be described to provide an overall understanding of the principles of the methods and systems disclosed herein. One or more examples of these embodiments are illustrated in the accompanying drawings. The methods and systems specifically described herein and illustrated in the accompanying drawings are non-limiting exemplary embodiments and that the scope of the present invention is defined by the claims. The features illustrated or described in connection with one exemplary embodiment may be combined with the features of other embodiments. Such modifications and variations are intended to be included within the scope of the present invention.

Various terms are used herein consistent with their ordinary meanings in the art. The term "substantially in real time" as it relates to the display of images means that the images are displayed as they are acquired without first storing them in a permanent memory and then retrieving them from the permanent memory and displaying them or displaying images within a second of being captured.

The present invention generally provides systems and methods for obtaining still or video images of a field of view, while magnifying at least a portion of the field of view and maintaining user context within the overall field of view. In some embodiments, the systems and methods of the present invention advantageously allow the simultaneous generation of wide angle and magnified images corresponding to different portions of the field of view. The term "magnification" is used herein consistent with its common usage in the art, and particularly in the field of digital imaging, to refer to detailed representation of a portion of the overall field of view. As an example, conventional magnifying optical lenses and mirrors, typically offer a magnification in the range of 2× to 20×.

Figure 1:
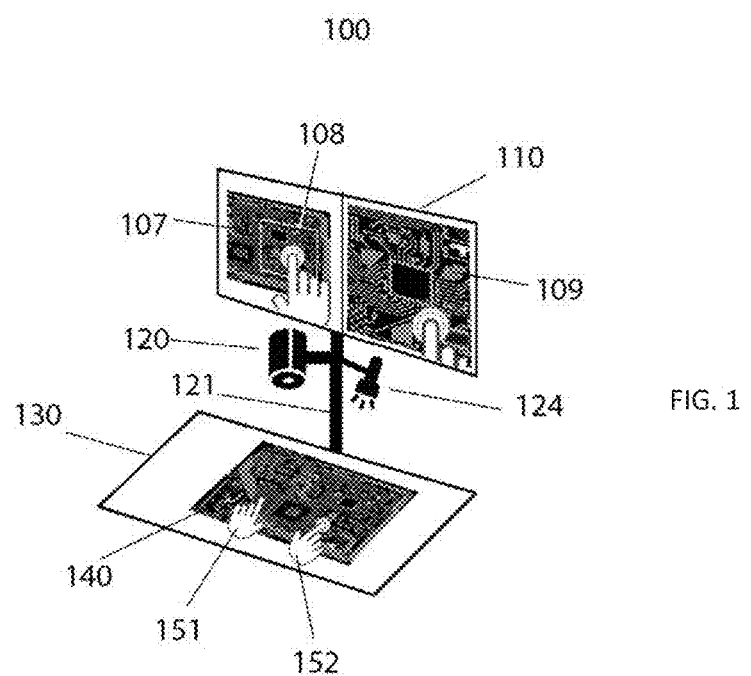
FIG. 1 is a perspective representation of an exemplary embodiment of an imaging system according to an embodiment of a digital magnifying lens.

With reference to FIG. 1, an exemplary imaging system 100 according to an embodiment of the invention includes a camera 120 and optionally a light source 124 mounted on a stand 121 for collecting images from a field of view 130. The camera 120 provides the necessary resolving power through a combination of optical magnification, for example 2× to 20×, and digital magnification, for example an image sensor with 10-100 megapixels in resolution. In some embodiments, the camera may be fitted with a fish-eye lens to improve user context. In yet other embodiments, the camera may be panning or tilting and the stand 121 may be movable in height or distance to optimize the orientation and position of the camera 120 relative to object 140. In some embodiments, an additional IR source and camera can be used to collect depth-of-field or 3D information to detect taps or movement toward or away from the camera, such as that used in the Kinect system from Microsoft Corp.

In some embodiments, the associated display system 110 may be attached to the stand 121 or movable. In other embodiments the display 110 may be mounted on an independently adjustable stand, head mounted, or the display may be provided via a computer screen or a remote display device linked via a wired or wireless connection. The exemplary display system 110, provides one or more view ports to the field of view 130, for example view ports 107 and 109 at different magnification levels side-by-side. Alternatively view-ports can be arranged in PIP, or other convenient arrangement. In some embodiments, the view ports generally are maintained in an interlocked relationship with object 140, to maintain user perspective. In the digital magnifier embodiment, the camera 120 continuously captures a first image of the field of view 130, for example at the rate of 30 to 60 frames per second, including the object 140.

Figure 2:
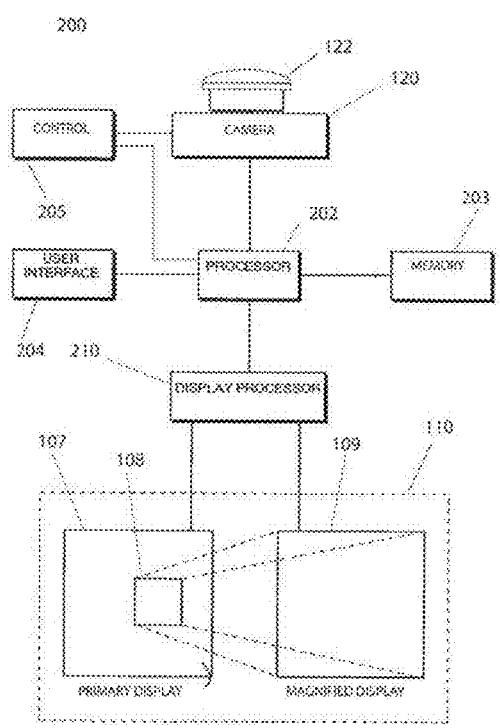
FIG. 2 is a schematic diagram depicting an exemplary embodiment of the image processing system.

With reference to FIG. 2, a system 200 can be used for image capture and display in some embodiments, system 200 includes a processor 202 for handling the capturing, storage, display, and manipulation in response to user interface or features extracted from an image, of images captured via the camera. Images captured may be stored in memory 203 by processor 202. Additionally, information about salient features in images, such as hand gestures, can be stored in memory 203, as well as user settings. A user interface module 204 is in communication with the processor 202 to transmit user commands received via a keyboard, joystick, mouse, or touch control. For example, the user interface module can be adapted to receive user commands that are indicative of a portion of the image to be presented, or used for the purpose of system configuration. The user interface module can communicate information associated with the user commands to the processor. The processor can in turn issue suitable control signals, e.g., for selecting a detailed view of the overall image, in response to the received user commands. As explained throughout, a user may also communicate commands to the processor via hand gestures captured in the images. Controller 205 receives commands from processor 202 to control the operation of camera 120 to capture images through lens 122. This allows the processor 202 to manipulate the field of view or control any necessary focus, zooming, panning, tilting, and the like.

In this example, the processor 202 routinely sends a copy of each captured image generated by the camera to the display processor 210 in order to generate the overview image 107 (FIG. 1). A region of interest, 108 within the overview image is sometimes manually selected for magnification purposes via the user interface 204 or via gesture control, in accordance with some embodiments. The second image 109, representing the magnified view of region 108, is displayed for example adjacent to the first image 107 to maintain user context. By way of example, the teachings of U.S. Pat. No. 6,833,843 entitled "Panoramic Imaging and Display System with Canonical Magnifier," which is herein incorporated by reference in its entirety, can be employed to correct the geometrical distortions of the wide-angle first image. In other cases in which a wide-angle lens is not utilized, such corrections may not be needed.

For example, the processor can affect the correction of a portion of a fish-eye image by mapping a point (u,v) on an undistorted image plane representing a perspective-corrected portion of a distorted image to a point (x,y) on an image plane representing the distorted image by utilizing the following mathematical formulas according to the teachings of the invention:

$$x=R(\beta_0/(PI/2))\cos(\delta_0)$$

$$y=R(\beta_0/(PI/2))\sin(\delta_0)$$

$$t=[Dd+\sqrt{(D^2d^2-(u^2+v^2+d^2)(D^2-1))}]/(u^2+v^2+d^2)$$

$$\beta_0=\arctan(-D\cos(\beta)+dt\cos(\beta)-vt\sin(\beta),1)$$

$$\delta_0=\arctan(-D\sin(\beta)+dt\sin(\beta)+vt\cos(\beta),ut)+d$$

where $\beta$ and $\delta$ are the zenith and azimuthal angles corresponding to the center of the undistorted image, $\beta_0$ and $\delta_0$ are the zenith and azimuthal angles corresponding to a pixel (u,v) in the undistorted image, d is the magnification factor, D is a distance of a viewing point from the center of hemisphere which correlates with the level of undistortion, and R is the radius of the fisheye image.

As the user operates on different portions of object 140, e.g., performing assembly or inspection of small parts on a PCB, as exemplified in FIG. 1, the region of interest 108 and the corresponding magnified second image 109 can be routinely relocated and the magnification level adjusted as the task requires it. In prior art examples, the user needs to interrupt the work in progress, interact with the user interface 204, select a new magnification region 108 and level, then resume the operation. Most manual procedures prevent shifting a hand from the work area to a knob, mouse, touchscreen, etc. during the procedure to control the magnifier, in particular when working with chemicals, fluids, adhesives and live subjects. By way of example, the U.S. Patent Application Publication No. 20110289462 A1, entitled "Computing Device Magnification Gesture," teaches using gestures to streamline magnification while using touch controlled devices. Similar techniques can be adopted to non-contact vision based user interfaces.

For example, the magnification gesture to be recognized through detection of a user's hand. Motion of the fingers can be detected to indicate in gesture, such as a pinch to zoom. Alternatively, detection of individual finger position can be used to determine a preset zoom level. Responses to this gesture, a processor will magnify a portion of the image field, such as by extracting the portion of the image from memory and directing that portion through the screen in a larger format. For example, a first image having the entire image field may be compressed, such that only some pixel information is displayed throughout the entire image to be fitted to the portion of the screen for display. A zoomed-in portion may include further pixel information made possible by a small portion of the image field being displayed in a larger area the screen.

In some embodiments, the processor 202 can be programmed to aid user interaction, by analyzing the first image 107, to automatically detect the object 140 and motion in the field of view, in particular changes in the position, orientation and shape of the user's hands. The processor can utilize image recognition algorithms known in the art, for detecting objects, hands and gestures. For example, U.S. Pat. No. 5,974,169 entitled "Machine Vision Methods for Determining Characteristics of an Object Using Boundary Points and Bounding Regions," and U.S. Pat. No. 9,390,320 entitled "Performing hand gesture recognition using 2D image data," disclose examples of applicable techniques for image recognition and processing.

An exemplary method includes finding points in the image on the boundary of the object. The method further includes identifying bounding boxes, or regions, in the image that correspond to edges of the object. For a rectilinear object, for example, this includes using a bounding box for each of the top, bottom, left and right edges of the object. The boundary points in the image are labeled to denote the respective edges to which they belong based on (i) the locations and orientations of those points, and (ii) locations of the plural bounding boxes. In some embodiments, points apparently lying on a boundary of the object, but outside a bounding box, are ignored—and, more particularly, are denoted as not corresponding to an edge. Likewise, apparent boundary points lying within a bounding box, but at an angle not associated with the corresponding to the respective edge of the object, are ignored.

In some embodiments, a software module determines a second tone distribution for a plurality of pixels in an image that uses a pixel-based value distribution to conduct one or more blob-based hand gesture determinations with respect to the image. The software can create blocks of available structures that have a shape similar to the shape of the Gaussian distribution in two dimensions. This blob-based approach may alleviate computational complexity associated with pixel-based image analysis. The shape of each blob in the image can be analyzed and compared to expected shapes for hands. This is accomplished via a set of rules or any machine learning techniques.

Tracking the motion of the object 140 and the hands, within the field of view, and in some cases between multiple cameras, can be performed by comparing successive image frames from each camera to identify one or more objects, if any, that have moved within the field of view. By way of example, the teachings of U.S. Pat. No. 6,734,911 entitled "Tracking Camera Using a Lens that Generates Both Wide-Angle and Narrow-Angle Views," can be employed to track moving objects within a field of view. As an example, the object tracking algorithm can first determine movement by differencing a series of sequential images and determining edge boundaries for moving objects, a process referred to as segmentation in the art. From these boundaries motion vectors can be estimated for each object and the processor can use these to stabilize the image. To improve accuracy of hand recognition, a predictive model of the hand may be utilized to calculate best estimate probabilistic predictions for the position of the fingers, for example index, middle, and thumb fingers. This type of object tracking algorithm is well-known in the art and is the subject of continuing research and publications. In some embodiments, the system uses a camera equipped with dual-angle optics to obtain both a wide-angle image and a narrow-angle image of a scene. The narrow-angle image provides a high resolution view of the scene, and the wide-angle image is used for finding and following the object being tracked. If the object moves out of the high resolution area, information obtained using the wide-angle, lower resolution image is used to find the object. The aim of the camera is then adjusted so that the object will once again appear in the narrow-angle image.

A shortcoming of traditional magnifiers is image distortion introduced in the form of shake and loss of focus at higher magnifications. The source of this type of distortion is typically external vibration induced into the magnifier stand, for example nearby machinery, or movements of the subject itself relative to the magnifier. In either case, high magnifications amplify small displacements present anywhere in the optical path making them highly noticeable. Software-based or optical image stabilizers referenced in prior art can effectively cancel image shake by bending the optical axis of the lens or shifting the images after they are captured prior to display. Examples of image stabilized systems include binoculars, camcorders and surveillance video cameras with high powered zoom lenses.

A useful solution for digital magnifiers can cancel shake and movements present in the object plane. As an example, the operator can identify an object of interest in the field-of-view through a point-and-tap gesture for the purpose of image stabilization. The system can then maintain a stabilized image, removing shake as well as locking onto the object if it moves while centering the resulting image for the operator. Object-based motion estimation and tracking techniques are well known in the arts, for example, as described in U.S. Pat. No. 6,480,615 B1, "Motion estimation within a sequence of data frames using optical flow with adaptive gradients."

Figure 3:
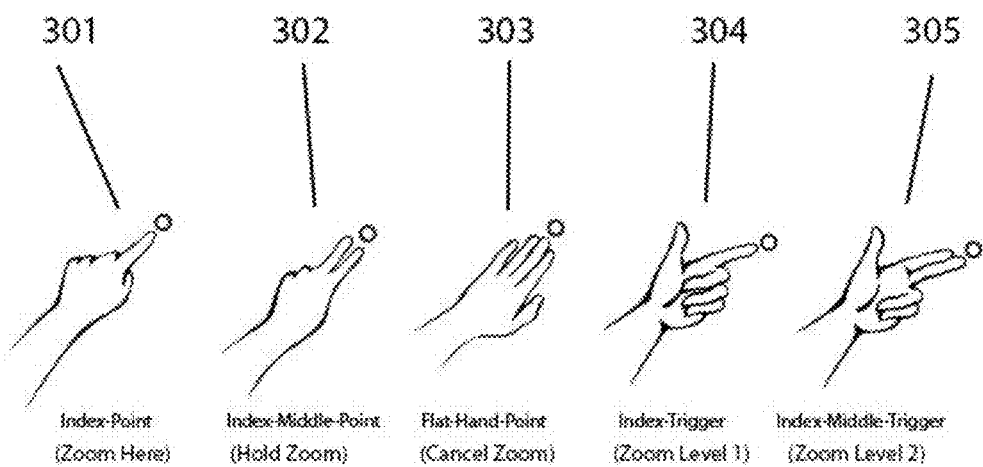
FIG. 3 is a schematic diagram illustrating an exemplary classification of a users' hand gestures for use with some embodiments.
Figure 4:
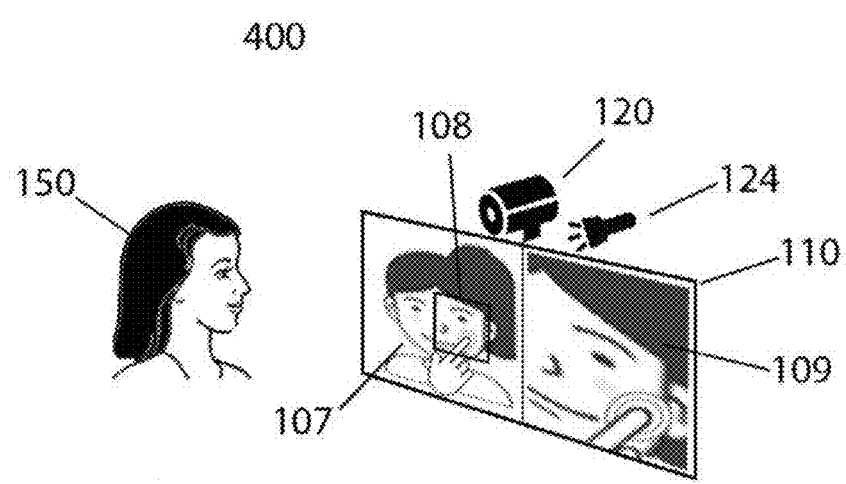
FIG. 4 is a schematic representation of an exemplary embodiment of an imaging system according to some embodiments of a virtual mirror.

In some embodiments, the processor can be configured to track the user's hands and fingers as they are moving within the field of view to detect gestures. For example, FIG. 3 schematically depicts exemplary hand gestures to control the magnification process. In these embodiments, the processor can analyze the first image (e.g., a wide-angle image) to detect the moving hand. As noted above, in many embodiments, the processor can utilize appropriate image recognition software to detect the position and posture of the individual fingers on each hand. FIG. 4 depicts examples of hand gestures to control the magnification process. For example, the hand gesture 301 (index-finger point) can be used to direct the window 108 to the position of the index finger on the left hand 151. Hand gesture 302 (two-finger point), for example, can lock the position of the zoom window 108 to object 140, instead of tracking with the user's hand. The hand gesture 303 (flat hand point), for example can cancel hand gesture 302. Hand gestures 304 (index trigger point) and 305 (two finger trigger point) could be used to select preset magnification levels, for example 10× and 50× respectively. Other hand gestures can be used, such as dynamic gestures that include pinching to zoom or waving to cancel a screen or zoom lock.

The user can select the right hand 152 or the left hand 151 exclusively, or alternately for tracking purposes, as well as the offset position of the second image in relation to the index finger.

With reference to FIG. 4, another embodiment of the invention is an exemplary smart digital mirror system 400. The digital mirror embodiment is similar to the digital magnifier embodiment shown in FIG. 1, except the object 140 is the operator who may be performing, for example, a personal care procedure. Similarly, the digital mirror system includes a camera 120, in this example wall mounted adjacent to the display 110. The camera 120 can be oriented in front and directed towards the user, providing the necessary resolving power to capture small details through a combination of optical magnification, for example 2× to 20×, and digital magnification, e.g., an image sensor for example with 10-100 megapixel resolution. In some embodiments, the camera may be fitted with a fish eye lens. In some embodiments, the camera may be panning or tilting and the stand may be movable in height or distance to optimize the orientation and position of the camera relative to user.

The system 400 can further include a user interface module 204 (FIG. 2) that is in communication with the processor 202, e.g., for receiving user commands for example touch control. By way of example, the user interface module can be adapted to receive user commands that are indicative of a portion of the image to be presented, etc. The user interface module can communicate information associated with the user command to the processor. The processor can, in turn, issue suitable control signals, e.g., to extract a detailed view of the user from the overall image, in response to the received user commands. In some embodiments, the user interface module 204, may directly obtain head, face, and hand positions and gestures via the camera.

With reference to exemplary embodiment in FIG. 4, the camera 120 continuously captures an overview first image 107, for example at the rate of 30 to 60 frames per second, including the user 150. The processor 202 sends a horizontally flipped copy (mirror image) of each captured image from the camera 120 to the display processor 210 for the purpose of displaying the overview image. A region of interest, 108 can then be manually selected for magnification purposes via the user interface 204/via gestures. The second image 109, representing the magnified view of region 108, is displayed on the same screen adjacent to the first image 107. By way of example, the teachings of U.S. Pat. No. 6,833,843 entitled "Panoramic Imaging and Display System with Canonical Magnifier," which is herein incorporated by reference in its entirety, can be employed to correct the geometrical distortions of the wide-angle first image. In other cases in which a wide-angle lens is not utilized, such corrections may not be needed.

The basic user interaction with the digital mirror, is similar to a conventional optical magnifying mirror, for example when applying cosmetics, e.g., hair and skin products, the magnified image can be relocated and the zoom level adjusted to provide detailed views of new positions as necessary. In this example, cosmetic personal care procedures highly benefit from having both user hands free, in another example, while trimming facial hair, one hand may be used to hold a comb while the other applies a cut using a pair of scissors. Additionally, for example if the head moves, the magnified image will preferably track the head position. Hands free control and automatic tracking of the magnification system, including repositioning and changing the magnification levels, in digital mirror systems is novel.

In some implementations, the processor can 202 can analyze the first image 107 to detect one or more moving objects, in particular the users' head or face and/or hands. Alternatively, the processor can be configured to detect changes in the orientation or shape of the user's face, head or hands, for example, to detect a hand gesture. The processor can utilize well-known image recognition algorithms for detecting objects, faces and gestures. A variety of image recognition algorithms were previously referenced. For example, U.S. Pat. No. 8,818,034 entitled "Face recognition apparatus and methods," disclose examples of face recognition algorithms.

In some embodiments, a face region is detected in an input image. One or more facial recognition categories are assigned to the face region. Each of the facial recognition categories is associated with a respective set of one or more different feature extraction modules and a respective set of one or more different facial recognition matching modules. For each of the facial recognition categories assigned to the face region, the input image is processed with each of the feature extraction modules associated with the facial recognition category to produce a respective facial region descriptor vector of facial region descriptor values characterizing the face region. A recognition result between the face region and a reference face image is determined based on application of the one or more matching modules associated with the facial recognition categories assigned to the face region to the facial region descriptor vectors produced for the face region detected in the input image. Further, well-known image processing techniques can be employed to detect the position and motion of the hand relative to the face of the user within a field of view as described earlier. Face and hand recognition as well as object tracking algorithms are well-known in the art and the subject of continuing research and publications.

Furthermore, and as noted above, in some implementations the processor can be configured to track the user's hands and fingers as they are moving within the field of view. By way of example, FIG. 3 schematically depicts exemplary hand gestures to control the magnification process. In such a case, the processor can analyze the first image (e.g., a wide-angle image) to detect the moving hand. As noted above, in many embodiments, the processor can utilize appropriate image recognition software to detect the position and posture of the individual fingers on each hand. FIG. 3 depicts examples of hand gestures to control the magnification process. For example, the hand gesture 301 can be used to direct the window 108 to the position of the index finger on the left hand 151. The hand gesture 302, for example can fix the zoom window 108 instead of tracking with the hand movements. The hand gesture 303, for example can cancel hand gesture 302. The hand gestures 304 and 305 can be used to select preset magnification levels, for example 10× and 50× respectively. The user can select the right hand 152 or the left hand 151 exclusively, or alternately for tracking purposes, as well as the offset position of the second image in relation to the index finger.

Figure 5:
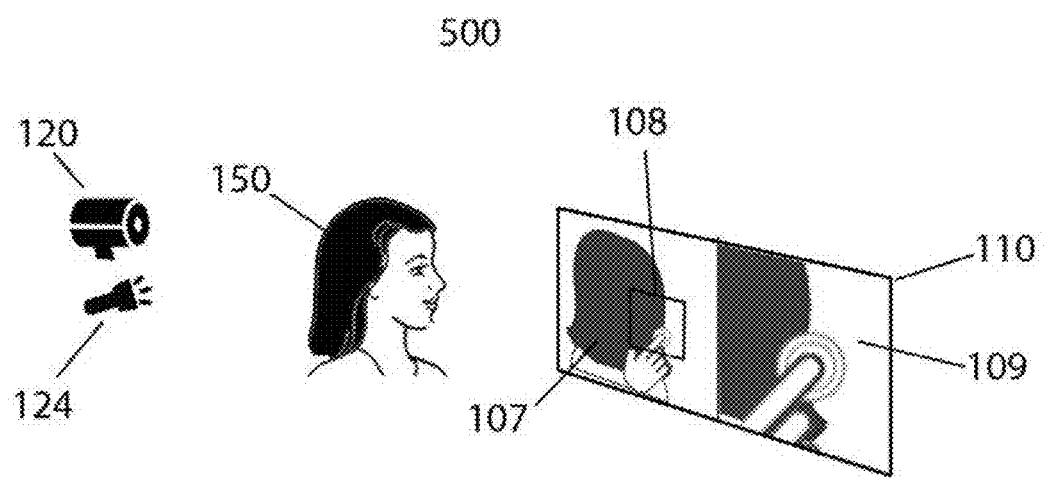
FIG. 5 is a schematic representation of an exemplary embodiment of an imaging system according to some embodiments of a virtual mirror used to eliminate a blind spot.
Figure 6:
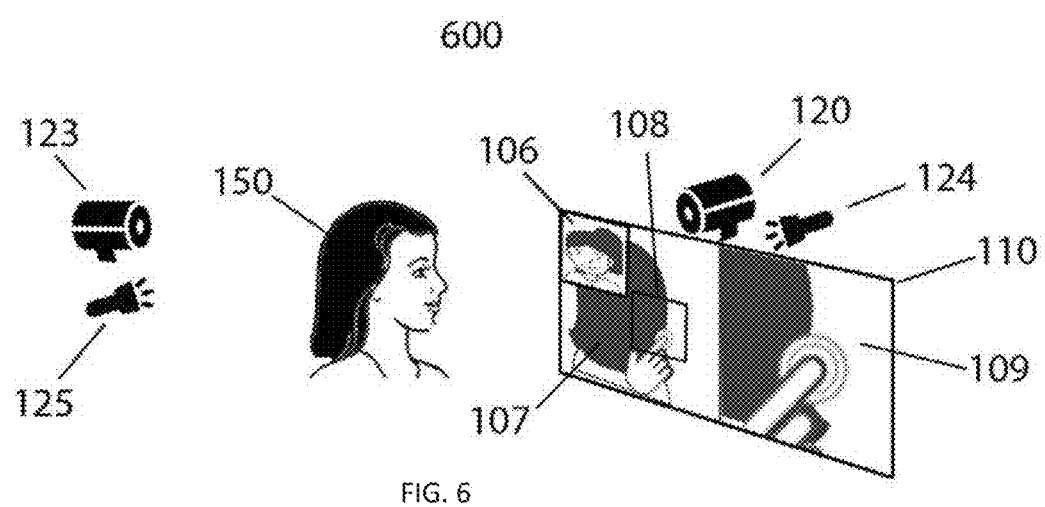
FIG. 6 is a schematic representation of an exemplary embodiment of an imaging system according to some embodiments of a virtual mirror with multi-camera positions to allow 3D coverage of the subject.

With reference to FIG. 5, in the exemplary digital mirror embodiment 500, the camera 120 can be positioned remotely as a rear view camera relative to the user 150. Image data from the rear view position can be captured by camera 120 and provided to the processor 202 via a remote wired or wireless link, for example using Wi-Fi or Bluetooth, as depicted schematically in FIG. 2. In yet another embodiment 600, shown in FIG. 6, a secondary independent rear view camera, for example may be located behind the user. As previously disclosed, the processor 202 can track the user's head, face and hands and can communicate magnification parameters to the system 200 via the user's hand gestures. In exemplary system 600, another display port, for example 106, can be used to display the inactive camera, in this case 120. Similarly, the system can be extended to use additional cameras as they add advantageous vantage points, in either digital magnification or digital mirror embodiments.

In some embodiments, a tablet or smartphone can be used for the camera, display and processor hardware, such as the hardware shown in FIG. 2. Either the front or rear-facing camera can be used to provide the images for processing and display. For example, a tablet can be configured in software to act as a magnifying mirror that is controlled by a user' hand gestures in a manner disclosed herein.

Figure 7:
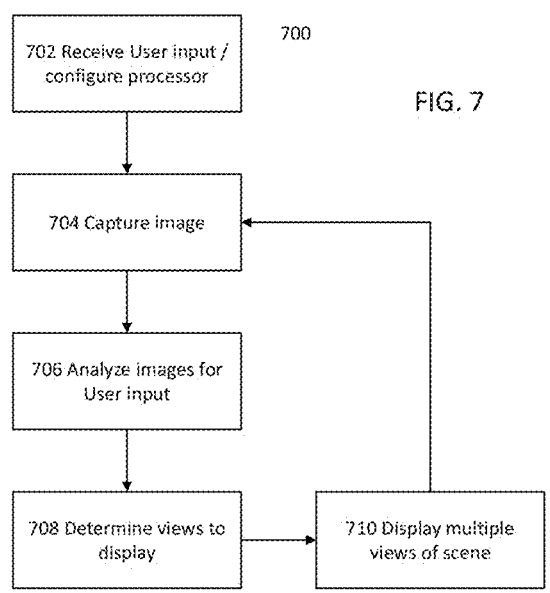
FIG. 7 is a flowchart illustrating an exemplary use of some embodiments of a digital magnifier system.

FIG. 7 is a flow chart of an exemplary method 700 for using the embodiment of the digital night system. At step 702, user input is received via a user interface, such as the touchscreen, mouse, etc. to configure the system. This allows the user to select the camera display that will be used. For example, a user may configure the system to provide a mirror image of images captured to use the camera as a digital mirror. The user may also select default zoom or default portions of the image to focus the images. These user configurations, along with software stored in memory accessible to the processor configure the processor to operate the image magnification and display system. At step 704, the camera captures an image of a scene. The scene can include an object that the user is interacting with, or the user herself. The scene will also, at least from time to time, include one or more hands of the user.

Images captured can be analyzed by a processor at step 706. The processor can detect salient features in the image, including the user's hands. The images for the user's hands are further analyzed to detect gestures by the user that can indicate to the processor how to manipulate and display the images. For example, the gesture indicating the zoom level will be analyzed by the processor to determine that the user is selecting a certain zoom level via the hand gesture. Once the images are analyzed by the processor, the processor then determines one or more views to display to the user via a display at step 708. For example, based on user configuration or default settings, the processor can determine that a full view of the scene should be displayed, as well as a zoomed-in portion of that view responsive to the user's hand gestures. At step 710, the processor facilitates the display of multiple views of the scene. This will generally include a full view of the scene and a zoomed-in portion of the scene responsive to the user interface and gestures. In some embodiments, multiple zoomed-in views can be simultaneously displayed. The process then repeats, capturing successive images of the scene.

Those having ordinary skill in the art will appreciate that various changes can be made to the above embodiments without departing from the scope of the invention. All patent and non-patent publications mentioned herein are incorporated by reference in their entirety.

What is claimed is:

1. A system for capturing and displaying images comprising:
   a camera configured to capture images of a scene;
   an electronic display configured to simultaneously display at least two views of the captured images to a user in substantially real time, the views comprising a first view and a second, magnified, narrower view; and
   one or more processors configured to analyze the captured images to detect gestures made by the user's hand, to control the first view and/or the second, magnified, narrower view in response to the detected gestures,
   wherein the one or more processors are further configured to determine one or more estimated dimensions of an object in the captured images and to automatically select a magnification level for the second magnified, narrower view based on the estimated dimensions,
   wherein the one or more processors are further configured to determine said estimated dimensions by measuring said dimensions of the object in pixels using the user's hand or one or more fingers of the user's hand as a relative scale and via comparison with previously obtained data.

2. The system of claim 1, wherein at least one of said images contains an image of a finger of the user and the one or more processors are configured to center the second magnified, narrower view relative to said image of the finger of the user.

3. The system of claim 1, wherein the one or more processors are configured to center the second magnified, narrower view on the object in response to a hand gesture of the user.

4. The system of claim 1, wherein the images of the scene contain an image of a user and the electronic display and the camera face the same direction, such that the user can see himself in the display when interacting with the camera.

5. The system of claim 4, wherein the displayed views are a mirror of the captured images.

6. A system of capturing and displaying images, comprising: at least one processor housed in a computing device, the at least one processor configured to perform the following steps: receiving captured images of a scene from a camera; controlling an electronic display to simultaneously display at least two displayed views of the captured images to a user in substantially real time, the at least two displayed views comprising a first view and a magnified, narrower second view; analyzing the captured images to detect gestures made by the user's hand; controlling the magnified, narrower second view in response to the detected gestures; determining estimated dimensions of an object in the captured images by measuring said dimensions of the object in pixels using the user's hand or one or more fingers of the user's hand as a relative scale and via comparison with previously obtained data; and automatically selecting a magnification level of the magnified, narrower second view based on the estimated dimensions.

7. The system of claim 6, wherein at least one of the captured images contains an image of a finger of the user and a plurality of software instructions further configure the processor to center the magnified, narrower second view relative to said image of the finger of the user.

8. The system of claim 6, wherein the software instructions further configure the processor to center and stabilize the magnified, narrower second view on the object in response to a hand gesture of the user.

9. The system of claim 6, wherein at least one of said images contains an image of the user and electronic display and the camera face the same direction, such that the user can see himself in the display when interacting with the camera.

10. The system of claim 7, wherein the software instructions further configure the processor to control at least one of the displayed views to be a mirror of the captured image corresponding to said at least one displayed view.

11. A method for capturing and displaying images comprising the steps of:
    capturing, using a camera, successive images of a scene;
    configuring a processor to control an electronic display and to analyze the captured images to detect gestures made by a user's hand and to determine a plurality of views of successive images to display in response to the detected gestures;
    determining, by the processor, estimated dimensions of an object in the captured images by measuring said dimensions of the object in pixels using the user's hand or one or more fingers of the user's hand as a relative scale and via comparison with previously obtained data;
    automatically selecting a magnification level for a second view of said plurality of views based on the estimated dimensions; and simultaneously displaying, by the processor via the electronic display, at least two views of the captured images to a user, the displayed views comprising a first view and said second view, wherein said second view is magnified and narrower relative to said first view.

12. The method of claim 11, wherein said images contain an image of a finger of a user and the method further comprising centering and stabilizing the magnified, narrower second view relative to said image of the finger of the user.

13. An imaging system, comprising: at least one camera for capturing a time-sequenced images of a scene, a processor for analyzing said images so as to detect an object and user's hand in said scene, a display in communication with said processor for displaying at least first and second views of said scene based on said captured images, where the second view corresponds to a narrower field of view of said scene relative to the first view and is characterized by a magnification level greater than a magnification associated with the first view, wherein the processor is configured for determining estimated dimensions of the object in the captured images by measuring said dimensions of the object in pixels using the user's hand or one or more fingers of the user's hand as a relative scale and via comparison with previously obtained data and to automatically select a magnification level of the second view based on the estimated dimensions.

14. The imaging system of claim 13, wherein said processor determines which part of the scene is displayed in said second view based on said detected object.

15. A smart digital mirror, comprising:
a camera configured to capture images of a scene, wherein the camera is positioned to image a portion of a user,
an electronic display configured to simultaneously display at least two views of the captured images of the user to the user in substantially real time, the views comprising a first view and a second, magnified, narrower view of the at least portion of the user; and
one or more processors configured to analyze the captured images to detect gestures made by the user's hand, to control the first view and/or the second, magnified, narrower view in response to the detected gestures, the processor is configured for determining estimated dimensions of an object in the captured images by measuring said dimensions of the object in pixels using the user's hand or one or more fingers of the user's hand as a relative scale and via comparison with previously obtained data and to automatically select a magnification level for the second view based on the estimated dimensions.

* * * * *